US012802982B2

(12) United States Patent
Wang et al.

(10) Patent No.: US 12,802,982 B2
(45) Date of Patent: Nov. 17, 2026

(54) TERNARY COMPOSITE MATERIAL FOR ALL-SOLID-STATE BATTERY, PREPARATION METHOD THEREOF AND APPLICATION THEREOF

(71) Applicant: Ningbo Ronbay New Energy Technology Co., Ltd., Yuyao Ningbo (CN)

(72) Inventors: Chao Wang, Yuyao Ningbo (CN); Daoyan Feng, Yuyao Ningbo (CN); Miao Jiang, Yuyao Ningbo (CN); Chao Ye, Yuyao Ningbo (CN); Xuan Xiao, Yuyao Ningbo (CN); Xufeng Yan, Yuyao Ningbo (CN); Rui Liu, Yuyao Ningbo (CN); Jonghee Lee, Yuyao Ningbo (CN); Hui Sun, Yuyao Ningbo (CN); Sangyul You, Yuyao Ningbo (CN)

(73) Assignee: Ningbo Ronbay New Energy Technology Co., Ltd., Yuyao Ningbo (CN)

( * ) Notice: Subject to any disclaimer, the term of this patent is extended or adjusted under 35 U.S.C. 154(b) by 181 days.

(21) Appl. No.: 18/885,230

(22) Filed: Sep. 13, 2024

(65) Prior Publication Data

US 2025/0002372 A1 Jan. 2, 2025

Related U.S. Application Data

(63) Continuation-in-part of application No. PCT/CN2023/077848, filed on Feb. 23, 2023.

(30) Foreign Application Priority Data

Mar. 14, 2022 (CN) ........................ 202210246513.5

(51) Int. Cl.
*H01M 10/0525* (2010.01)
*C01G 53/504* (2025.01)
(Continued)

(52) U.S. Cl.
CPC .......... *H01M 4/525* (2013.01); *C01G 53/504* (2025.01); *C01G 53/506* (2025.01);
(Continued)

(58) Field of Classification Search
CPC .......... C01F 17/36; C01F 7/54; C01G 49/009; C01G 51/82; C01G 53/50; C01G 53/506;
(Continued)

(56) References Cited

U.S. PATENT DOCUMENTS

2013/0071745 A1 3/2013 Park et al.
2020/0152976 A1 5/2020 Cui et al.
(Continued)

FOREIGN PATENT DOCUMENTS

CN 108091857 A 5/2018
CN 108493478 A 9/2018
(Continued)

OTHER PUBLICATIONS

Machine translation KR20210103874 (Year: 2021).*
(Continued)

*Primary Examiner* — Victoria H Lynch
(74) *Attorney, Agent, or Firm* — Quarles & Brady LLP

(57) ABSTRACT

The present application provides a ternary composite material for an all-solid-state battery, including a ternary material and a fast ion conductor of $Li_xM_yF_{x+3y}$ in-situ coated on the surface of the ternary material; the application also provides a preparation method for ternary composite material and its application. On the one hand, the presence of $Li_xM_yF_{x+3y}$ in the ternary composite material provided by the present application improves the interfacial contact between the
(Continued)

ternary positive electrode material and the solid electrolyte, improves the high-voltage resistance performance of the solid electrolyte, and reduces side reactions between the ternary positive electrode and the solid electrolyte and the electrolyte decomposition caused by high voltage. On the other hand, the fast ion conductor property of $Li_xM_yF_{x+3y}$ effectively improves the lithium ion conductivity of the ternary positive electrode material and reduces the residual lithium on the surface of the ternary positive electrode material.

10 Claims, 6 Drawing Sheets

(51) Int. Cl.
*C01G 53/506* (2025.01)
*H01M 4/525* (2010.01)

(52) U.S. Cl.
CPC ..... *H01M 10/0525* (2013.01); *C01P 2002/72* (2013.01); *C01P 2004/03* (2013.01); *C01P 2004/51* (2013.01); *C01P 2004/61* (2013.01); *C01P 2004/84* (2013.01); *C01P 2006/12* (2013.01); *C01P 2006/40* (2013.01)

(58) Field of Classification Search
CPC .............. C01P 2002/72; C01P 2004/03; C01P 2004/51; C01P 2004/61; C01P 2004/80; C01P 2004/84; C01P 2006/12; C01P 2006/40; H01M 10/0525; H01M 10/0562; H01M 2004/021; H01M 2004/028; H01M 4/131; H01M 4/366; H01M 4/485; H01M 4/505; H01M 4/525; H01M 4/62; H01M 4/628; Y02E 60/10
See application file for complete search history.

(56) References Cited

U.S. PATENT DOCUMENTS

| | | | | |
|---|---|---|---|---|
| 2022/0216463 | A1 | 7/2022 | Kwak et al. | |
| 2024/0258508 | A1 * | 8/2024 | Fujinoki | H01M 10/052 |

FOREIGN PATENT DOCUMENTS

| | | | | | |
|---|---|---|---|---|---|
| CN | 108511786 | A | | 9/2018 | |
| CN | 110277539 | A | | 9/2019 | |
| CN | 110867573 | A | | 3/2020 | |
| CN | 110867576 | A | | 3/2020 | |
| CN | 112397779 | A | | 2/2021 | |
| CN | 112786893 | A | | 5/2021 | |
| CN | 114614012 | A | | 6/2022 | |
| CN | 114709398 | A | | 7/2022 | |
| KR | 20210103874 | A | * | 8/2021 | H01M 4/625 |
| WO | 2017025957 | A1 | | 2/2017 | |

OTHER PUBLICATIONS

Chinese Office Action dated Oct. 12, 2023; for Chinese Application No. 202210246513.5 filed Mar. 14, 2022; Ningbo Ronbay New Energy Technology Co., Ltd.
Chinese Notice of Allowance dated May 23, 2024; for Chinese Application No. 202210246513.5 filed Mar. 14, 2022; Ningbo Ronbay New Energy Technology Co., Ltd.
International Search Report and Written Opinion for International Application No. PCT/CN2023/077848 filed on Feb. 23, 2023.
Extended European Search Report of Application No./Patent No. 23769538.2-1014 / 4481858 PCT/CN2023077848, Dated Oct. 31, 2025, 9 pages.

* cited by examiner

TERNARY COMPOSITE MATERIAL FOR ALL-SOLID-STATE BATTERY, PREPARATION METHOD THEREOF AND APPLICATION THEREOF

CROSS-REFERENCE TO RELATED APPLICATIONS

This application is a continuation-in-part of International Application No. PCT/CN2023/077848, filed on Feb. 23, 2023, which claims priority to Chinese Patent Application No. 202210246513.5, filed on Mar. 14, 2022, both of which are hereby incorporated by reference in their entireties.

TECHNICAL FIELD

The present application relates to the technical field of lithium-ion batteries, and in particular to a ternary composite material for all-solid-state battery, preparation method thereof and application thereof.

BACKGROUND

Nickel-rich ternary positive electrode material $LiNi_{1-x-y}Co_xMn_yO_2$ (NCM) has attracted much attention due to its ultra-high capacity and has the potential to replace traditional positive electrode material $LiCoO_2$ in lithium-ion battery applications.

However, the existing ternary materials still have some shortcomings, such as low discharge efficiency in the first cycle, poor battery performance at high rate, and serious lithium-nickel cations mixing in the material, which results in the poor cycle stability of the material and the low discharge platform.

In addition, for all-solid-state batteries, since the ternary NCM is a mixture of high ion and electronic conductivity, the solid electrolyte is a single lithium ion conductor. Therefore, the contact between the ternary NCM and the solid electrolyte will cause lithium ions to move from the solid electrolyte to the ternary NCM due to the large chemical potential difference, resulting in the formation of a space charge layer and the occurrence of interfacial reactions, and will produce high interfacial resistance that affects the battery's cycling capacity.

In order to solve these problems and make the ternary materials more suitable for people's application needs, a lot of work has been applied to the modification research of ternary NCM. A typical and effective method is surface coating modification. For example, $Al_2O_3$, $TiO_2$, $SiO_2$, $ZrO_2$, $La_2O_3$, $Y_2O_3$, ZnO, etc. are used as surface coating materials to improve their performance; however, these coating materials only adhere to the surface of ternary NCM and lack good ionic conductivity to accelerate the electrochemical reaction rate and the diffusion rate of lithium ions. Moreover, most of positive electrode material manufacturers adopt dry coating, which is to directly mix and sinter the nano-sized coating material with the substrate to obtain the coated positive electrode material. For materials prepared by this method, most of the coatings only adhere to or attach to the positive electrode material, rather than evenly covering the surface of the positive electrode material, therefore, they are easily peeled off by external mechanical forces and are more likely to agglomerate on their own.

SUMMARY

The technical problem solved by the present application is to provide a ternary composite material. The ternary composite positive electrode material of the present application can improve the interface contact between the ternary positive electrode material and the solid electrolyte, and at the same time can also improve the lithium ion conductivity of the ternary positive electrode material.

In view of this, the present application provides a ternary composite material for an all-solid-state battery, including a ternary material and a fast ion conductor in situ coated on the surface of the ternary material, the fast ion conductor being represented by formula (I);

$$Li_xM_yF_{x+3y} \quad (I);$$

where M is a trivalent metal ion;

$1 \le x \le 3$, $1 \le y \le 3$.

In an embodiment, the M is selected from Co, Fe, Al or Ce; and the fast ion conductor is selected from $Li_3AlF_6$, $LiCoF_4$, $Li_3FeF_6$, $Li_3CoF_6$, $Li_3Ce_2F_9$, $LiFeF_4$, $Li_3CeF_6$, $LiAlF_4$ or $Li_3Co_2F_9$.

In an embodiment, the high-nickel ternary material is $LiNi_aCo_bR_{1-a-b}O_2$, where R is Al or Mn, $0.6<a<0.96$, and $0<b \le 0.1$.

In an embodiment, the average particle size of $Li_xM_yF_{x+3y}$ is 5 nm or more, and the high-nickel ternary composite material has a D50 of 3-5 μm, a specific surface area of 0.1-1 $m^2/g$, and a coating ratio great than 85%.

The present application also provides a method for preparing the ternary composite material, including the following steps:

A) mixing a lithium source, a fluorine source and a trivalent metal compound in a stoichiometric ratio to obtain $Li_xM_yF_{x+3y}$ precursor;

B) adding the $Li_xM_yF_{x+3y}$ precursor into a ternary material and mixing to obtain a composite material;

C) sintering the composite material at high temperature in a pure oxygen atmosphere to obtain $Li_xM_yF_{x+3y}$-coated ternary composite material.

In an embodiment, the lithium source is selected from one or more of lithium nitrate, lithium hydroxide, lithium carbonate and lithium fluoride; the fluorine source is selected from one or more of ammonium fluoride, ammonium bifluoride, hydrogen fluoride, aluminum fluoride and lithium fluoride; and the trivalent metal compound is selected from one or more of cobalt nitrate, ferric nitrate, cerium nitrate, aluminum nitrate, cobalt oxide, iron oxide, cerium oxide, aluminum oxide, cobalt fluoride, iron fluoride, cerium fluoride, aluminum fluoride, cobalt hydroxide, ferric hydroxide, cerium hydroxide and aluminum hydroxide.

In an embodiment, the addition amount of the $Li_xM_yF_{x+3y}$ precursor is 0.1-15 wt % of the ternary material.

In an embodiment, in step A), the mixing method is one or more of mechanical stirring, magnetic stirring and mechanical ball milling; in step A), a mixing time is 10 hours to 30 hours; in step B), the mixing method is one or more of mechanical stirring, magnetic stirring and mechanical ball milling; in step B), a mixing time is 10 hours to 30 hours.

In an embodiment, in step C), a sintering temperature is 250-650° C. and a sintering time is 5-20 hours.

The present application also provides a solid-state lithium-ion battery, including a positive electrode and a negative electrode, where the material of the positive electrode is the ternary composite material or a ternary composite material prepared by the preparation method.

The present application provides a ternary composite material, which is composed of a ternary material and a fast ion conductor $Li_xM_yF_{x+3y}$ coated on the surface of the ternary material; where the presence of $Li_xM_yF_{x+3y}$ improves the interfacial contact between the ternary positive electrode material and the solid electrolyte, improves the high-voltage resistance performance of the solid electrolyte, reduces the side reactions between the ternary positive electrode and the solid electrolyte and the electrolyte decomposition caused by high voltage, and on the other hand, the fast ion conductor properties of $Li_xM_yF_{x+3y}$ effectively improve the lithium ion conduction capacity of the ternary positive electrode material and reduce the residual lithium on the surface of the ternary positive electrode material.

Furthermore, the present application also provides a method for preparing a ternary composite material, which includes uniformly mixing a $Li_xM_yF_{x+3y}$ precursor with a ternary positive electrode material and sintering them at a high temperature in a pure oxygen atmosphere, thereby in situ coating a layer of uniformly distributed fast ion conductor $Li_xM_yF_{x+3y}$ on the surface of the ternary material; this preparation method is beneficial to improving the stability of the coating layer, making it less likely to fall off.

DESCRIPTION OF EMBODIMENTS

Figure 1:
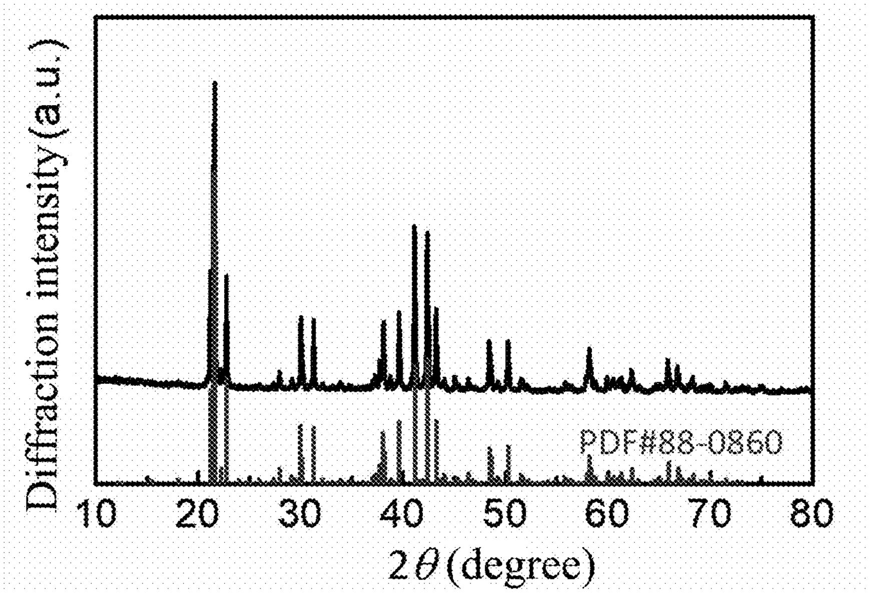
FIG. 1 is an XRD (X-ray diffraction) diagram of a $Li_3AlF_6$ precursor sintered at 280° C. in Example 1 of the present application.

In order to further understand the present application, preferred embodiments of the present application are described below in conjunction with examples. However, it should be understood that these descriptions are only for further illustrating the features and advantages of the present application, rather than limiting the claims of the present application.

In view of the poor performance of ternary materials in lithium-ion batteries in the prior art, the present application provides a ternary composite material, where, the surface of the ternary material is in-situ coated with a fast ion conductor $Li_xM_yF_{x+3y}$, which is used as a coating material to modify nickel-rich ternary positive electrode materials, such as $Li_3AlF_6$, $LiCoF_4$, $Li_3FeF_6$, $Li_3CoF_6$, $Li_3Ce_2F_9$, $LiFeF_4$, $Li_3CeF_6$, $LiAlF_4$ or $Li_3Co_2F_9$. These lithium ion conductors not only exhibit excellent ionic conductivity, but also have excellent phase stability and high voltage resistance (1.0-6.5V vs. Li/Li+20) and chemical stability, which can enhance the $Li^+$ diffusion between the solid electrolyte and the positive electrode material and effectively prevent the side reaction between the positive electrode material and the solid electrolyte. Specifically, an embodiment of the present application discloses a high-nickel ternary composite material, including a ternary material and a fast ion conductor in situ coated on the surface of the ternary material, the fast ion conductor being shown in formula (I);

$$Li_xM_yF_{x+3y} \quad (I);$$

where M is a trivalent metal ion;

$1 \le x \le 3$, $1 \le y \le 3$.

In the ternary composite material described in the present application, the M is selected from trivalent metal ions, specifically selected from Co, Fe, Al or Ce; the x is specifically selected from 1, 2 or 3, and the y is specifically selected from 1, 2 or 3; in the present application, the fast ion conductor is selected from $Li_3AlF_6$, $LiCoF_4$, $Li_3FeF_6$, $Li_3CoF_6$, $Li_3Ce_2F_9$, $LiFeF_4$, $Li_3CeF_6$, $LiAlF_4$ or $Li_3Co_2F_9$. The problem with the positive electrode at this stage is that the voltage range of the positive electrode is relatively large (about 2.5-4.4V), and the solid electrolyte will decompose under high voltage, affecting the life of the battery. Ordinary fast ion conductors can only simply improve the material's ion conductivity, while F-based fast ion conductors not only have ion conductivity but also have the property of high-voltage resistance. After coating with the F-based fast ion conductors, it is equivalent to directly adding a high-voltage resistant protective layer to the solid electrolyte and the positive electrode material, which can effectively prevent the decomposition of the solid electrolyte under high voltage, and some F atoms will be doped into the surface layer of the positive electrode material to replace the position of oxygen. Due to the strong electronegativity of F, it can effectively reduce the precipitation of lattice oxygen and effectively improve the structural stability of the material.

In the present application, the ternary material is a ternary material well known to those persons of ordinary skill in the art. In the present application, it is specifically $LiNi_aCo_bR_{1-a-b}O_2$, where R is Al or Mn, $0.6<a<0.96$, $0<b\le0.1$; in a specific embodiment, the high-nickel ternary material can be $LiNi_{0.86}Co_{0.09}Mn_{0.05}O_2$.

In the ternary composite material described in the present application, the average particle size of $Li_xM_yF_{x+3y}$ is 5 nm or more; and the ternary composite material has a D50 of 3-5 μm, a specific surface area of 0.1-1 $m^2/g$, and a coating ratio great than 85%.

The present application also provides a method for preparing the ternary composite material, including the following steps:

A) mixing a lithium source, a fluorine source and a trivalent metal compound in a stoichiometric ratio to obtain $Li_xM_yF_{x+3y}$ precursor;

B) adding the $Li_xM_yF_{x+3y}$ precursor into a ternary material and mixing to obtain a composite material;

C) sintering the composite material at high temperature in a pure oxygen atmosphere to obtain $Li_xM_yF_{x+3y}$ coated ternary composite material.

In the preparation process of the ternary composite material, the present application first prepares the F-based fast ion conductor $Li_xM_yF_{x+3y}$ precursor, specifically, a lithium source, a fluorine source and a trivalent metal compound are mixed according to a stoichiometric ratio to obtain the $Li_xM_yF_{x+3y}$ precursor. In this process, the lithium source is selected from lithium sources familiar to those persons of ordinary skill in the art. In the present application, the lithium source is selected from one or more of lithium nitrate, lithium hydroxide, lithium carbonate and lithium fluoride; the fluorine source is selected from one or more of ammonium fluoride, ammonium bifluoride, hydrogen fluoride, aluminum fluoride and lithium fluoride; the trivalent metal compound is selected from one or more of cobalt nitrate, iron nitrate, cerium nitrate, aluminum nitrate, cobalt oxide, iron oxide, cerium oxide, aluminum oxide, cobalt fluoride, iron fluoride, cerium fluoride, aluminum fluoride, cobalt hydroxide, ferric hydroxide, cerium hydroxide and aluminum hydroxide. The mixing method may be mechanical mixing, magnetic stirring, or mechanical ball milling, and the mixing time is 10 hours to 30 hours, more specifically, the mixing time is 12 hours to 20 hours.

In the present application, the $Li_xM_yF_{x+3y}$ precursor obtained above is then added to the ternary material, and after mixing, a composite material is obtained; also in this process, the mixing method may be mechanical mixing, magnetic stirring, mechanical ball milling, or a combination of thereof. The mixing time is 10 hours to 30 hours, more specifically, the mixing time is 12 hours to 20 hours. The present application has no particular limitation on the preparation method of the ternary material, which may be carried out according to methods well known to those persons of ordinary skill in the art. The addition amount of the $Li_xM_yF_{x+3y}$ precursor is 0.1-15 wt % of the ternary material. Specifically, the addition amount of the $Li_xM_yF_{x+3y}$ precursor is 0.1-5 wt % of the ternary material. More specifically, the addition amount of the $Li_xM_yF_{x+3y}$ precursor is 0.1%, 0.5%, 1%, 2%, 3%, 4% or 5%.

According to the present application, the composite material is finally sintered at high temperature in a pure oxygen atmosphere to obtain a ternary composite material. In the present application, the sintering is carried out in one of a muffle furnace, a tube furnace and a box furnace, the sintering temperature is 250-650° C., in a specific embodiment, the sintering temperature is 280-600° C.; the sintering time is 5-20 h, in a specific embodiment, the sintering time is 8-12 h.

The present application also provides a solid-state lithium-ion battery, which includes a positive electrode and a negative electrode, and the material of the positive electrode is the ternary composite material described in the above scheme.

In a solid-state lithium-ion battery, other components such as a negative electrode, a solid electrolyte, etc. are all components of lithium-ion batteries such as negative electrodes and solid electrolytes well known to those persons of ordinary skill in the art, which will not be repeated herein.

The present application provides a high-voltage-resistant $Li_xM_yF_{x+3y}$ in-situ coated ternary positive electrode material suitable for solid-state lithium-ion batteries, a preparation method thereof and a solid-state lithium-ion battery, where a $Li_xM_yF_{x+3y}$ precursor is uniformly mixed with the ternary positive electrode material and a layer of uniformly distributed fast ion conductor $Li_xM_yF_{x+3y}$ is in-situ coated on the surface of the ternary material during high-temperature sintering. On the one hand, the presence of $Li_xM_yF_{x+3y}$ improves the interfacial contact between the ternary positive electrode material and the solid electrolyte, improves the high-voltage resistance performance of the solid electrolyte, reduces the side reactions between the ternary positive electrode and the solid electrolyte and the electrolyte decomposition caused by high voltage; and on the other hand, the fast ion conductor properties of $Li_xM_yF_{x+3y}$ effectively improve the lithium ion conductivity of the ternary positive electrode material and reduce the residual lithium on the surface of the ternary positive electrode material. The present application has simple operation, low raw material cost and small equipment investment in the whole preparation process and is suitable for batch production.

In order to further understand the present application, the ternary composite material provided by the present application is described in detail below in conjunction with embodiments, and the protection scope of the present application is not limited by the following embodiments.

In the following examples, the particle size of the sample can be tested by a laser particle size analyzer (MasterSizer 2000); the specific surface area of the powder sample of the positive electrode material can be tested by a specific surface area and pore size analyzer (Micromeritics 3 Flex) using the conventional BET method; the surface of the nickel-rich ternary positive electrode material can be measured by X-ray photoelectron spectroscopy (XPS) analysis to obtain the corresponding contents of respective elements: NiXPS, CoXPS, MnXPS and MXPS, and the coating ratio can be calculated by the equation: coating ratio=MXPS/(NiXPS+CoXPS+MnXPS+MXPS), where the detection depth of XPS is within 10 nm.

Example 1

S1, lithium nitrate as a lithium source, ammonium fluoride as a fluorine source and aluminum nitrate as an aluminum source are mixed according to a stoichiometric ratio by mechanical stirring for 10 hours to obtain a $Li_xM_yF_{x+3y}$ precursor.

S2, the $Li_xM_yF_{x+3y}$ precursor having a mass fraction of 0.1% and obtained in step S1 is added to the ternary positive electrode material, and subjected to mechanical stirring for 10 hours to obtain a mixed positive electrode material.

S3, the mixed positive electrode material obtained in step S2 is sintered at 280° C. in a box furnace for 8 hours, and cooled to obtain a $Li_3AlF_6$-coated ternary positive electrode material.

Figure 2:
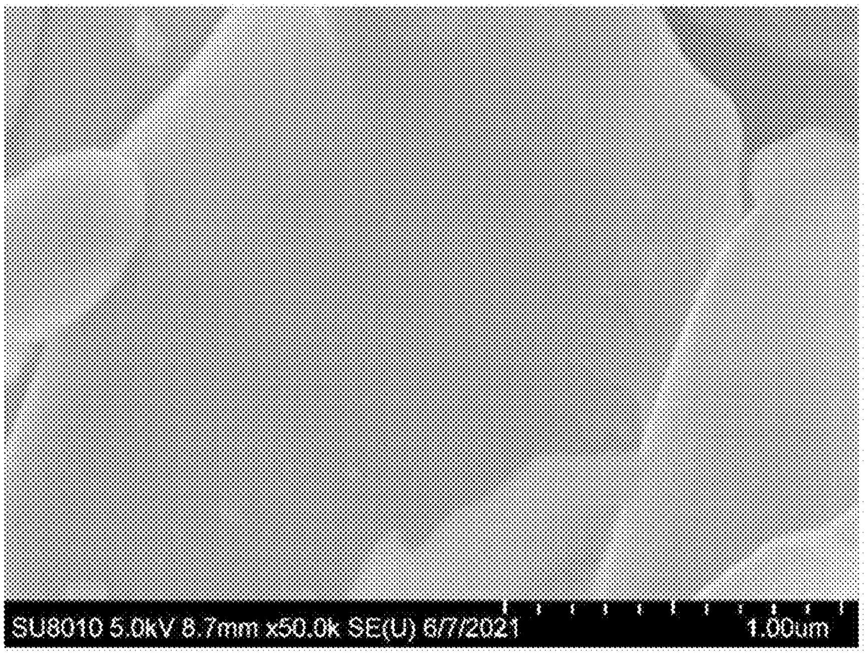
FIG. 2 is an SEM (Scanning Electron Microscope) image of a ternary positive electrode material before coating in Example 1 of the present application.
Figure 3:
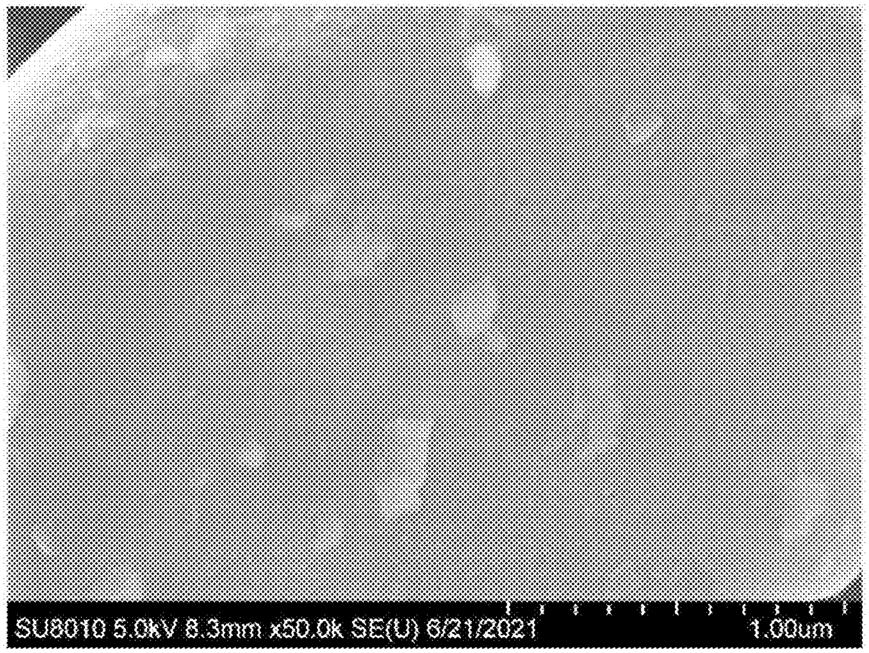
FIG. 3 is an SEM image of the ternary positive electrode materials coated with $Li_3AlF_6$ in Example 1 of the present application.

FIG. 1 is the XRD diagram of the $Li_3AlF_6$ precursor sintered at 280° C. in Example 1 of the application, and FIGS. 2 and 3 are SEM images of the ternary positive electrode material $LiNi_{0.86}Co_{0.09}Mn_{0.05}O_2$ in Example 1 of the application before and after coating. It can be seen from FIGS. 2 and 3 that after the ternary positive electrode are in situ coated with the fast ion conductor $Li_3AlF_6$, the $Li_3AlF_6$ nanoparticles are clearly visible and evenly distributed on the surface of the ternary material, and the surface becomes rough. The original size of the ternary material is not changed after coating. After testing, the prepared $Li_3AlF_6$-coated ternary positive material has a D50 of 3.5 μm, a specific surface area of 0.68 $m^2/g$, and a coating ratio of 90%.

Example 2

S1, lithium hydroxide as a lithium source, lithium fluoride as a fluorine source and cobalt oxide as a cobalt source are mixed according to a stoichiometric ratio by mechanical ball milling for 28 hours to obtain a $LiCoF_4$ precursor.

S2, the $LiCoF_4$ precursor having a mass fraction of 5% and obtained in step S1 is added to the ternary positive electrode material $LiNi_{0.83}Co_{0.1}Mn_{0.07}O_2$, and subjected to mechanical ball milling for 30 hours to obtain a mixed positive electrode material.

S3, the mixed positive electrode material obtained in step S2 is sintered at 650° C. in the box furnace for 20 hours, and cooled to obtain a $LiCoF_4$-coated ternary positive electrode material.

After testing, the prepared $LiCoF_4$-coated ternary positive material has a D50 of 4.5 μm, a specific surface area of 0.32 $m^2/g$, and a coating ratio of 97%.

The $LiCoF_4$-coated ternary positive electrode material in this embodiment is assembled into a solid-state battery according to the following steps.

For a positive electrode sheet, the ternary positive electrode material, a conductive agent, a binder and a solid electrolyte are dissolved in a certain amount of solvent at the mass ratio of 70%:2%:2%:26%, and mixed into a slurry with moderate viscosity, and then the slurry is evenly applied on an aluminum foil. The coated electrode sheet is placed in a vacuum oven at 120° C. and dried for 2 h. After it is completely dried, it is cut into circular electrode sheets with a diameter of 10 mm using a punching machine. After recording their mass, the circular electrode sheets are placed in the vacuum oven at 120° C. for 12 h to remove moisture, and finally stored in a glove box under an argon atmosphere. The areal loading of each prepared electrode sheet is around 15 $mg/cm^2$. The prepared electrode sheet is used as the positive electrode and is assembled into an all-solid-state battery using the metal lithium sheet as the counter electrode, and the sulfide electrolyte or the halide electrolyte as the solid electrolyte.

Battery test: the voltage window for battery charging and discharging is 2.5-4.25V; the rate test is carried out in the order of 0.2C charge/0.2C discharge, 0.5C charge/0.1C discharge, 0.5C charge/0.2C discharge, 0.5C charge/0.5C discharge, 0.5C charge/1.0C discharge, 0.5C charge/1.3C discharge, 0.5C charge/1.5C discharge, 0.5C charge/2.0C discharge and 0.5C charge/3.0C discharge.

Figure 4:
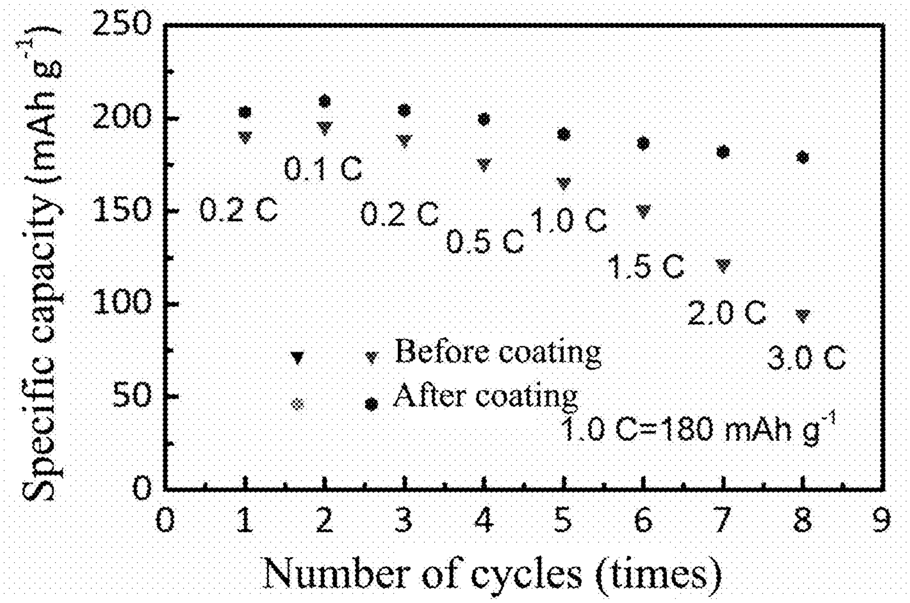
FIG. 4 is a charge-discharge rate curve of the ternary positive electrode materials coated with $LiCoF_4$ and uncoated in Example 2 of the present application.

FIG. 4 is the charge and discharge rate curves of the coated and uncoated ternary positive electrode materials in Example 2 of the present application. It can be seen from FIG. 4 that the rate performance of the ternary material is greatly improved after coating, especially at high current density, the capacity retention rate of the coated ternary material is relatively high. The reversible capacities of the uncoated ternary material at current densities of 0.1C, 0.2C, 0.5C, 1.0C, 1.5C, 2.0C and 3.0C (1.0C=180 mAh/g) are only 195.5, 188.5, 175.7, 165.9, 150.2, 121.7 and 94.3 mAh/g, respectively; the discharge capacities of the coated ternary material at current densities of 0.1C, 0.2C, 0.5C, 1.0C, 1.5C, 2.0C and 3.0C can reach 209.8, 204.2, 199.2, 191.9, 186.7, 182.5 and 179.1 mAh/g, respectively.

Example 3

S1, lithium carbonate as a lithium source, ammonium fluoride as a fluorine source and ferric hydroxide as an iron source are mixed according to a stoichiometric ratio by magnetic stirring for 20 hours to obtain a $Li_3FeF_6$ precursor.

S2, the $Li_3FeF_6$ precursor having a mass fraction of 2.5% and obtained in step S1 is added to the ternary positive electrode material $LiNi_{0.9}Co_{0.05}Mn_{0.05}O_2$, and subjected to magnetic stirring for 20 hours to obtain a mixed positive electrode material.

S3, the mixed positive electrode material obtained in step S2 is sintered at 400° C. in the box furnace for 10 hours, and cooled to obtain a $Li_3FeF_6$-coated ternary positive electrode material.

After testing, the prepared $Li_3FeF_6$-coated ternary positive material has a D50 of 4.7 μm, a specific surface area of 0.29 $m^2/g$, and a coating ratio of 93%.

The $Li_3FeF_6$-coated ternary positive electrode material in this embodiment is assembled into a battery according to the following steps.

For a positive electrode sheet, the ternary positive electrode material, a conductive agent, a binder and a solid electrolyte are dissolved in a certain amount of solvent at the mass ratio of 70%:2%:2%:26%, and mixed into a slurry with moderate viscosity, and then the slurry is evenly coated on the aluminum foil. The coated electrode sheet is placed in a vacuum oven at 120° C. and dried for 2 h. After it is completely dried, it is cut into circular electrode sheets with a diameter of 10 mm using a punching machine. After recording their mass, the circular electrode sheets are placed in the vacuum oven at 120° C. and dried for 12 h to remove moisture, and finally stored in the glove box under an argon atmosphere. The areal loading of each prepared electrode sheet is around 15 $mg/cm^2$.

The prepared electrode sheet is used as the positive electrode and is assembled into an all-solid-state battery using the metal lithium sheet as the counter electrode, and the sulfide electrolyte or the halide electrolyte as the solid electrolyte. Battery test: the voltage window for battery charging and discharging is 2.5-4.25V and the cycle test is carried out by performing 0.5C charge/0.5C discharge for 150 cycles.

Figure 5:
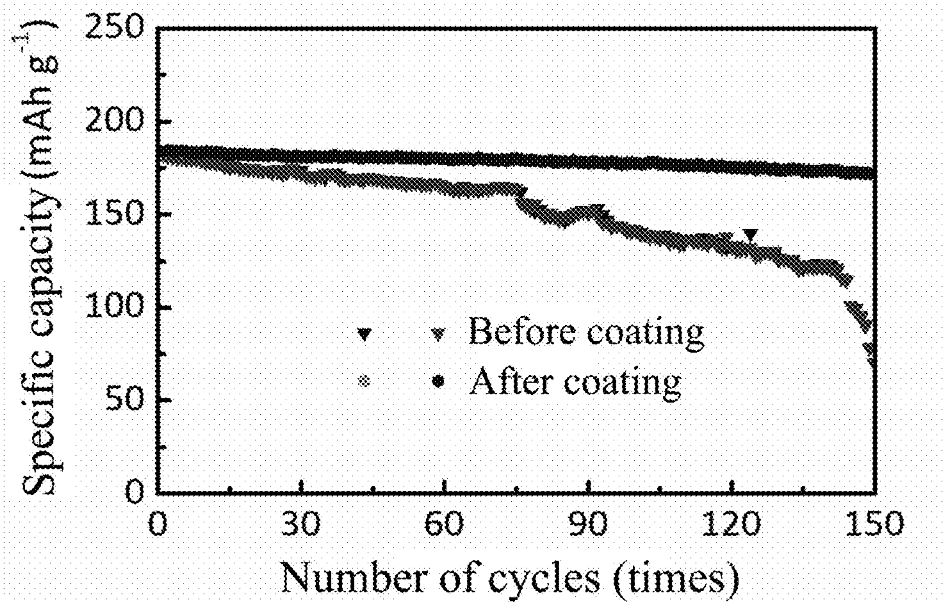
FIG. 5 is a cycle performance curve of the ternary positive electrode materials coated with $Li_3FeF_6$ and uncoated in Example 3 of the present application.

FIG. 5 is the cycle performance curve of the coated and uncoated ternary positive electrode materials in Example 3 of the present application. It can be seen from FIG. 5 that the cycle performance of the ternary material is greatly improved after coating, especially at high current density, the capacity retention rate of the coated ternary material is relatively high. After it is charged and discharged at a current density of 0.5C for 150 cycles, the capacity of the uncoated ternary material is only 71.6 mAh/g; after coating, the cycle stability of the ternary material is greatly improved, and the discharge capacity is 176.7 mAh/g after 150 cycles.

Example 4

S1, lithium carbonate as a lithium source, lithium fluoride as a fluorine source and cerium oxide as a cerium source are mixed according to a stoichiometric ratio by magnetic stirring for 20 hours to obtain a $Li_3Ce_2F_9$ precursor.

S2, the $Li_3Ce_2F_9$ precursor having a mass fraction of 0.5% and obtained in step S1 is added to the ternary positive electrode material $LiNi_{0.8}Co_{0.1}Mn_{0.1}O_2$, and subjected to magnetic stirring for 20 hours to obtain a mixed positive electrode material by.

S3, the mixed positive electrode material obtained in step S2 is sintered at 500° C. in the box furnace for 12 hours, and cooled to obtain a $Li_3Ce_2F_9$-coated ternary positive electrode material.

The $Li_3Ce_2F_9$-coated ternary positive electrode material in this embodiment is assembled into a solid-state battery according to the following steps.

For a positive electrode sheet, the ternary positive electrode material, a conductive agent, a binder and a solid electrolyte are dissolved in a certain amount of solvent at the mass ratio of 70%:2%:2%:26%, and mixed into a slurry with moderate viscosity, and then the slurry is evenly coated on the aluminum foil. The coated electrode sheet is placed in a vacuum oven at 120° C. and dried for 2 h. After it is completely dried, it is cut into circular electrode sheets with a diameter of 10 mm using a punching machine. After recording their mass, the circular electrode sheets are placed in the vacuum oven at 120° C. for 12 h to remove moisture, and finally stored in the glove box under an argon atmosphere. The areal loading of each prepared electrode sheet is around 15 mg/cm$^2$. The prepared electrode sheet is used as the positive electrode and is assembled into an all-solid-state battery using the metal lithium sheet as the counter electrode, and the sulfide electrolyte or the halide electrolyte as the solid electrolyte.

Battery test: the voltage window for battery charging and discharging is 2.5-4.25V; and the current density is 0.1C for charging and discharging.

Figure 6:
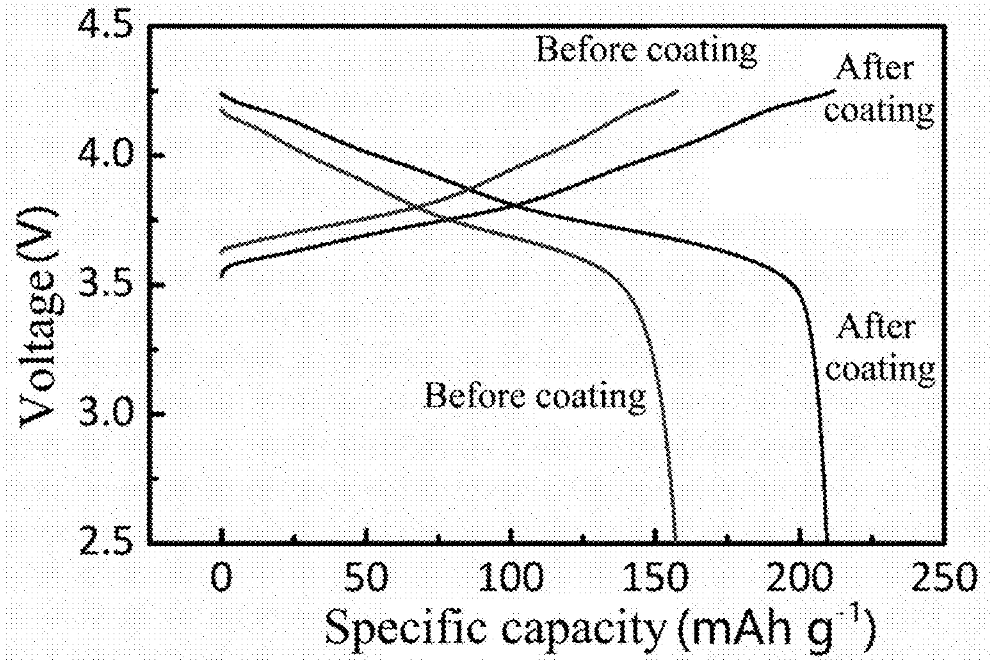
FIG. 6 is a charge-discharge curve of the ternary positive electrode materials coated with $Li_3Ce_2F_9$ and uncoated in Example 4 of the present application.

FIG. 6 is a charge-discharge curve of the coated and uncoated ternary positive electrode material in Example 4 of the present application. It can be seen from FIG. 6 that the capacity of the ternary material is greatly improved after coating.

Example 5

S1, lithium carbonate as a lithium source, lithium fluoride as a fluorine source and cobalt nitrate as a cobalt source are mixed according to a stoichiometric ratio by magnetic stirring for 20 hours to obtain a $Li_3CoF_6$ precursor.

S2, the $Li_3CoF_6$ precursor having a mass fraction of 1.5% and obtained in step S1 is added to the ternary positive electrode material $LiNi_{0.85}Co_{0.05}Mn_{0.1}O_2$, and subjected to magnetic stirring for 20 hours to obtain a mixed positive electrode material.

S3, the mixed positive electrode material obtained in step S2 is sintered at 500° C. in the box furnace for 12 hours, and cooled to obtain a $Li_3CoF_6$-coated ternary positive electrode material.

The $Li_3CoF_6$-coated ternary positive electrode material in this embodiment is assembled into a solid-state battery according to the following steps.

For a positive electrode sheet, the ternary positive electrode material, a conductive agent, a binder and a solid electrolyte are dissolved in a certain amount of solvent at the mass ratio of 70%:2%:2%:26%, and mixed into a slurry with moderate viscosity, and then the slurry is evenly coated on the aluminum foil. The coated electrode sheet is placed in a vacuum oven at 120° C. and dried for 2 h. After it is completely dried, it is cut into circular electrode sheets with a diameter of 10 mm using a punching machine. After recording their mass, the circular electrode sheets are placed in the vacuum oven at 120° C. for 12 h to remove moisture, and finally stored in the glove box under an argon atmosphere. The areal loading of each prepared electrode sheet is around 15 mg/cm$^2$. The prepared electrode sheet is used as the positive electrode and is assembled into an all-solid-state battery using the metal lithium sheet as the counter electrode, and the sulfide electrolyte or the halide electrolyte as the solid electrolyte.

Battery test: the voltage window for battery charging and discharging is 2.5-4.25V, and the current density is 0.1C for charging and discharging.

Figure 7:
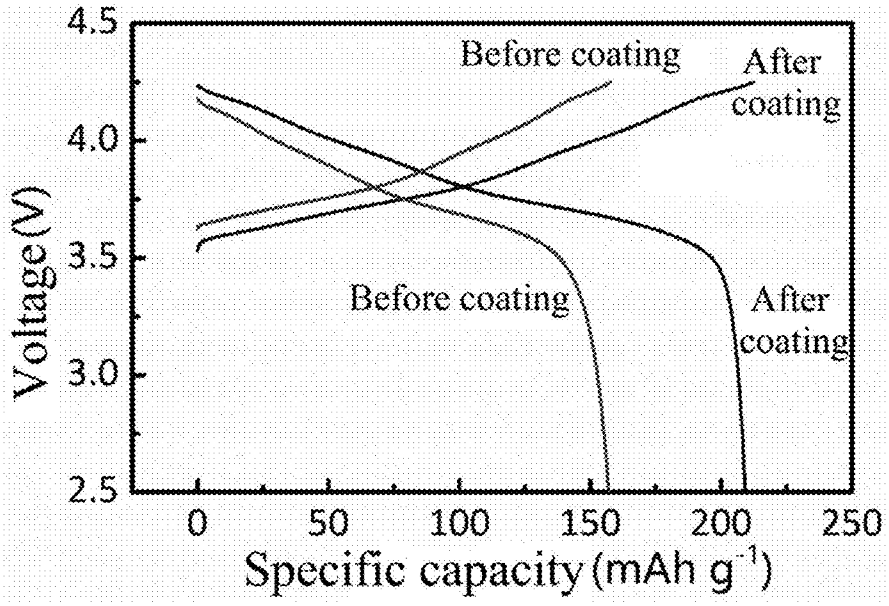
FIG. 7 is a charge-discharge curve of the ternary positive electrode materials coated with $Li_3CoF_6$ and uncoated in Example 5 of the present application.

FIG. 7 is a charge-discharge curve of the coated and uncoated ternary positive electrode materials in Example 5 of the present application. It can be seen from FIG. 7 that the capacity of the ternary material is greatly improved after coating.

Example 6

S1, lithium carbonate as a lithium source, lithium fluoride as a fluorine source and iron oxide as an iron source are mixed according to a stoichiometric ratio by magnetic stirring for 20 hours to obtain a $LiFeF_4$ precursor.

S2, the $LiFeF_4$ precursor having a mass fraction of 0.25% and obtained in step S1 is added to the ternary positive electrode material $LiNi_{0.88}Co_{0.06}Mn_{0.06}O_2$, and subjected to magnetic stirring for 20 hours to obtain a mixed positive electrode material.

S3, the mixed positive electrode material obtained in step S2 is sintered at 600° C. in the box furnace for 12 hours, and cooled to obtain a $LiFeF_4$-coated ternary positive electrode material.

The $LiFeF_4$-coated ternary positive electrode material in this embodiment is assembled into a solid-state battery according to the following steps.

For a positive electrode sheet, the ternary positive electrode material, a conductive agent, a binder and a solid electrolyte are dissolved in a certain amount of solvent at the mass ratio of 70%:2%:2%:26%, and mixed into a slurry with moderate viscosity, and then the slurry is evenly coated on the aluminum foil. The coated electrode sheet is placed in a vacuum oven at 120° C. and dried for 2 h. After it is completely dried, it is cut into circular electrode sheets with a diameter of 10 mm using a punching machine. After recording their mass, the circular electrode sheets are placed in the vacuum oven at 120° C. for 12 h to remove moisture, and finally stored in the glove box under an argon atmosphere. The areal loading of each prepared electrode sheet is around 15 mg/cm$^2$. The prepared electrode sheet is used as the positive electrode and is assembled into an all-solid-state battery using the metal lithium sheet as the counter electrode, and the sulfide electrolyte or the halide electrolyte as the solid electrolyte.

Battery test: the voltage window for battery charging and discharging is 2.5-4.25V, and the current density is 0.1C for charging and discharging.

Figure 8:
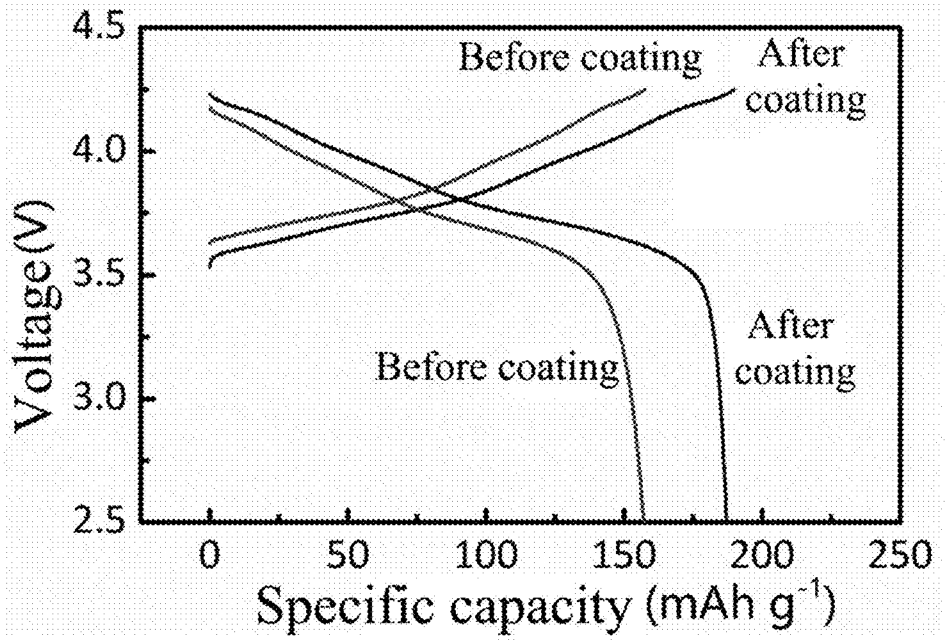
FIG. 8 is a charge-discharge curve of the ternary positive electrode materials coated with $LiFeF_4$ and uncoated in Example 6 of the present application.

FIG. 8 is a charge-discharge curve of the coated and uncoated ternary positive electrode materials in Example 6 of the present application. It can be seen from FIG. 8 that the capacity of the ternary material is greatly improved after coating.

Example 7

S1, lithium carbonate as a lithium source, lithium fluoride as a fluorine source and ferric chloride as an iron source are mixed according to a stoichiometric ratio by magnetic stirring for 20 hours to obtain a $Li_2FeF_5$ precursor.

S2, the precursor obtained in step S1 is sintered at 600° C. in a box furnace for 12 hours, and cooled to obtain $Li_2FeF_5$ powder.

At room temperature, the prepared $Li_2FeF_5$ fast ion conductor is subjected to electrochemical impedance spectroscopy test using stainless steel as an electrode. The result is: lithium ion conductivity of $2.5 \times 10^{-5}$ S/cm.

Example 8

S1, lithium carbonate as a lithium source, lithium fluoride as a fluorine source and cerium chloride as a cerium source are mixed according to a stoichiometric ratio by magnetic stirring for 20 hours to obtain a $Li_3CeF_6$ precursor.

S2, the precursor obtained in step S1 is sintered at 600° C. in a box furnace for 12 hours, and cooled to obtain $Li_3CeF_6$ powder.

At room temperature, the prepared $Li_3CeF_6$ fast ion conductor is subjected to electrochemical impedance spectroscopy test using stainless steel as an electrode. The result is: lithium ion conductivity of $1.5\times10^{-5}$ S/cm.

Example 9

S1, lithium carbonate as a lithium source, lithium fluoride as a fluorine source and aluminum fluoride as an aluminum source are mixed according to a stoichiometric ratio by magnetic stirring for 20 hours to obtain a $LiAlF_4$ precursor.

S2, the precursor obtained in step S1 is sintered at 600° C. in a box furnace for 12 hours, and cooled to obtain $LiAlF_4$ powder.

At room temperature, the prepared $LiAlF_4$ fast ion conductor is subjected to electrochemical impedance spectroscopy test using stainless steel as an electrode. The result is: lithium ion conductivity of $8\times10^{-5}$ S/cm.

Example 10

S1, lithium carbonate as a lithium source, ammonium bifluoride as a fluorine source and cobalt oxide as a cobalt source are mixed according to a stoichiometric ratio by magnetic stirring for 20 hours to obtain a $Li_3Co_2F_9$ precursor.

S2, the precursor obtained in step S1 is sintered at 600° C. in a box furnace for 12 hours, and cooled to obtain $Li_3Co_2F_9$ powder.

At room temperature, the prepared $Li_3Co_2F_9$ fast ion conductor is subjected to electrochemical impedance spectroscopy test using stainless steel as an electrode. The result is: lithium ion conductivity of $9\times10^{-5}$ S/cm.

Example 11

S1, lithium fluoride as a lithium source, and aluminum fluoride as a fluorine source and an aluminum source are mixed according to a stoichiometric ratio by a planetary ball mill for 20 hours to obtain a $Li_3AlF_6$ precursor.

S2, the $Li_3AlF_6$ precursors obtained in step S1 and having a mass fraction of 0.5 wt %, 1.0 wt %, 1.5 wt %, 2.0 wt % and 2.5 wt % are each added to the ternary positive electrode material $LiNi_{0.85}Co_{0.05}Mn_{0.1}O_2$; and mixed for 20 hours by a planetary ball mill to obtain a mixed positive electrode material.

S3, the mixed positive electrode material obtained in step S2 is sintered at 500° C. in a box furnace for 12 hours, and cooled to obtain ternary positive electrode materials coated with 0.5 wt %, 1.0 wt %, 1.5 wt %, 2.0 wt % and 2.5 wt % $Li_3AlF_6$ respectively.

The $Li_3AlF_6$-coated ternary positive electrode material in this embodiment is assembled into a solid-state battery according to the following steps.

For a positive electrode sheet, the ternary positive electrode material, a conductive agent, a binder and a solid electrolyte are dissolved in a certain amount of solvent at the mass ratio of 70%:2%:2%:26%, and mixed into a slurry with moderate viscosity, and then the slurry is evenly coated on the aluminum foil. The coated electrode sheet is placed in a vacuum oven at 120° C. and dried for 2 h. After it is completely dried, it is cut into circular electrode sheets with a diameter of 10 mm using a punching machine. After recording their mass, the circular electrode sheets are placed in the vacuum oven at 120° C. for 12 h to remove moisture, and finally stored in the glove box under an argon atmosphere. The areal loading of each prepared electrode sheet is around 15 mg/cm$^2$. The prepared electrode sheet is used as the positive electrode and is assembled into an all-solid-state battery using the metal lithium sheet as the counter electrode, and the sulfide electrolyte or the halide electrolyte as the solid electrolyte.

Battery test: the voltage window for battery charging and discharging is 2.5-4.25V, and the current density is 0.5C for charging and discharging.

Figure 9:
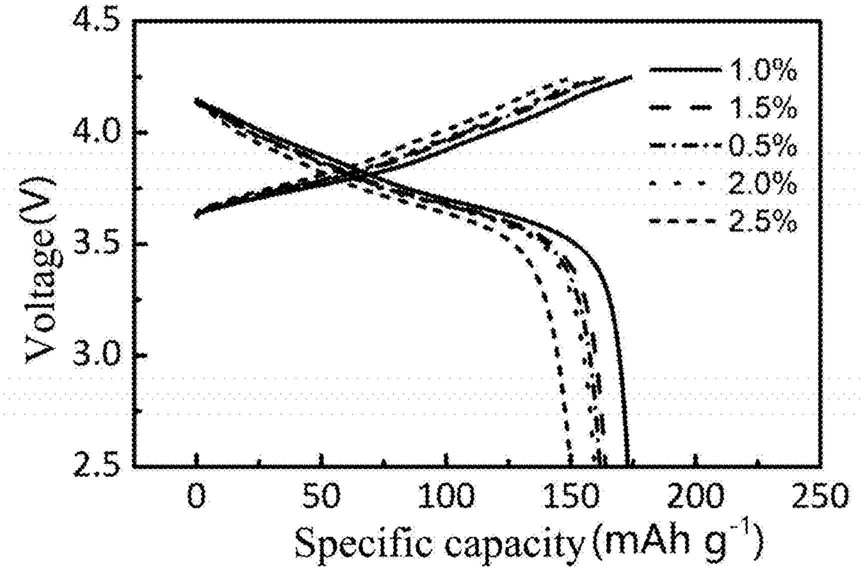
FIG. 9 is a charge-discharge curve of the ternary positive electrode materials coated with different contents of $Li_3AlF_6$ in Example 11 of the present application.

FIG. 9 shows the charge-discharge curve of the ternary positive electrode materials coated with 0.5 wt %, 1.0 wt %, 1.5 wt %, 2.0 wt % and 2.5 wt % $Li_3AlF_6$ in Example 11 of the present application in a sulfide all-solid-state battery. It can be seen from FIG. 9 that the ternary positive electrode material coated with 1.0 wt % $Li_3AlF_6$ exhibits the best performance.

Example 12

S1, lithium fluoride as a lithium source, and aluminum fluoride as a fluorine source and an aluminum source are mixed in a stoichiometric ratio by a planetary ball mill for 20 hours to obtain a $Li_3AlF_6$ precursor; and lithium hydroxide as a lithium source and titanium dioxide as a titanium source are mixed in a stoichiometric ratio by the planetary ball mill for 20 hours to obtain a $Li_4Ti_5O_{12}$ precursor.

S2, 1.0 wt % by mass fraction of the $Li_3AlF_6$ and $Li_4Ti_5O_{12}$ precursors obtained in step S1 are each added to the ternary positive electrode material $LiNi_{0.85}Co_{0.05}Mn_{0.1}O_2$, and mixed for 20 hours by a planetary ball mill to obtain a mixed positive electrode material.

S3, the mixed positive electrode obtained in step S2 is sintered at 500° C. in a box furnace for 12 hours, and cooled to obtain ternary positive electrode materials coated with 1.0 wt % $Li_3AlF_6$ and 1.0 wt % $Li_4Ti_5O_{12}$ respectively.

The ternary positive electrode materials coated with 1.0 wt % $Li_3AlF_6$ and 1.0 wt % $Li_4Ti_5O_{12}$ in this embodiment are each assembled into a solid-state battery according to the following steps.

For a positive electrode sheet, the ternary positive electrode material, a conductive agent, a binder and a solid electrolyte are dissolved in a certain amount of solvent at the mass ratio of 70%:2%:2%:26%, and mixed into a slurry with moderate viscosity, and then the slurry is evenly coated on the aluminum foil. The coated electrode sheet is placed in a vacuum oven at 120° C. and dried for 2 h. After it is completely dried, it is cut into circular electrode sheets with a diameter of 10 mm using a punching machine. After recording their mass, the circular electrode sheets are placed in the vacuum oven at 120° C. for 12 h to remove moisture, and finally stored in the glove box under an argon atmosphere. The areal loading of each prepared electrode sheet is around 15 mg/cm$^2$. The prepared electrode sheet is used as the positive electrode and is assembled into an all-solid-state battery using the metal lithium sheet as the counter electrode, and the sulfide electrolyte or the halide electrolyte as the solid electrolyte.

Battery test: the voltage window for battery charging and discharging is 2.5-4.25V, and the current density is 0.5C for charging and discharging.

Figure 10:
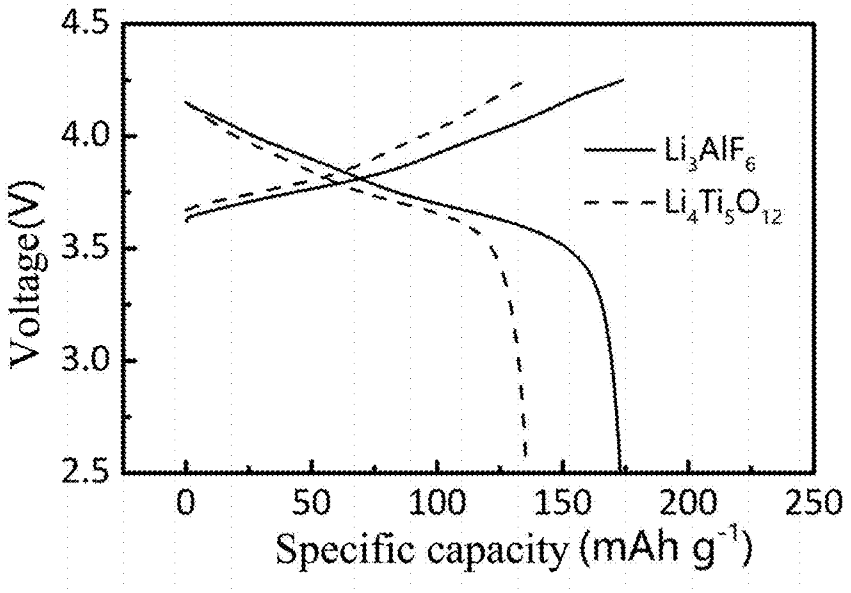
FIG. 10 is a charge-discharge curve of the ternary positive electrode materials coated with different types of fast ion conductors in Example 12 of the present application.

FIG. 10 is the charge-discharge curve of the ternary positive electrode materials coated with $Li_3AlF_6$ and $Li_4Ti_5O_{12}$ respectively in Example 12 of the present application in a sulfide all-solid-state battery. It can be seen from FIG. 10 that the ternary positive electrode material coated with 1.0 wt % $Li_3AlF_6$ exhibits better performance.

Example 13

S1, lithium fluoride as a lithium source, and aluminum fluoride as a fluorine source and an aluminum source are mixed according to a stoichiometric ratio by a planetary ball mill for 20 hours to obtain a $Li_3AlF_6$ precursor.

S2, 1.0 wt % by mass fraction of the $Li_3AlF_6$ precursor obtained in step S1 and 1.0 wt % by mass fraction of the $Li_3AlF_6$ finished product are each added to the ternary positive electrode material $LiNi_{0.85}Co_{0.05}Mn_{0.1}O_2$, and mixed for 20 hours by a planetary ball mill to obtain mixed positive electrode materials.

S3, the mixed positive electrode materials obtained in step S2 are sintered at 500° C. in a box furnace for 12 hours and cooled to obtain two 1.0 wt % $Li_3AlF_6$-coated ternary positive electrode materials. However, when the ternary positive electrode material coated with the $Li_3AlF_6$ finished product is sieved, white powder appears, indicating that part of the $Li_3AlF_6$ finished product is not coated on the surface of the ternary positive electrode material.

The two 1.0 wt % $Li_3AlF_6$-coated ternary positive electrode materials in this embodiment are each assembled into a solid-state battery according to the following steps.

For the positive electrode sheet, the ternary positive electrode material, a conductive agent, a binder and a solid electrolyte are dissolved in a certain amount of solvent at the mass ratio of 70%:2%:2%:26%, and mixed into a slurry with moderate viscosity, and then the slurry is evenly coated on the aluminum foil. The coated electrode sheet is placed in a vacuum oven at 120° C. and dried for 2 h. After it is completely dried, it is cut into circular electrode sheets with a diameter of 10 mm using a punching machine. After recording their mass, the circular electrode sheets are placed in the vacuum oven at 120° C. for 12 h to remove moisture, and finally stored in the glove box under an argon atmosphere. The areal loading of each prepared electrode sheet is around 15 mg/cm$^2$. The prepared electrode sheet is used as the positive electrode and is assembled into an all-solid-state battery using the metal lithium sheet as the counter electrode, and the sulfide electrolyte or the halide electrolyte as the solid electrolyte.

Battery test: the voltage window for battery charging and discharging is 2.5-4.25V, and the current density is 0.5C for charging and discharging.

Figure 11:
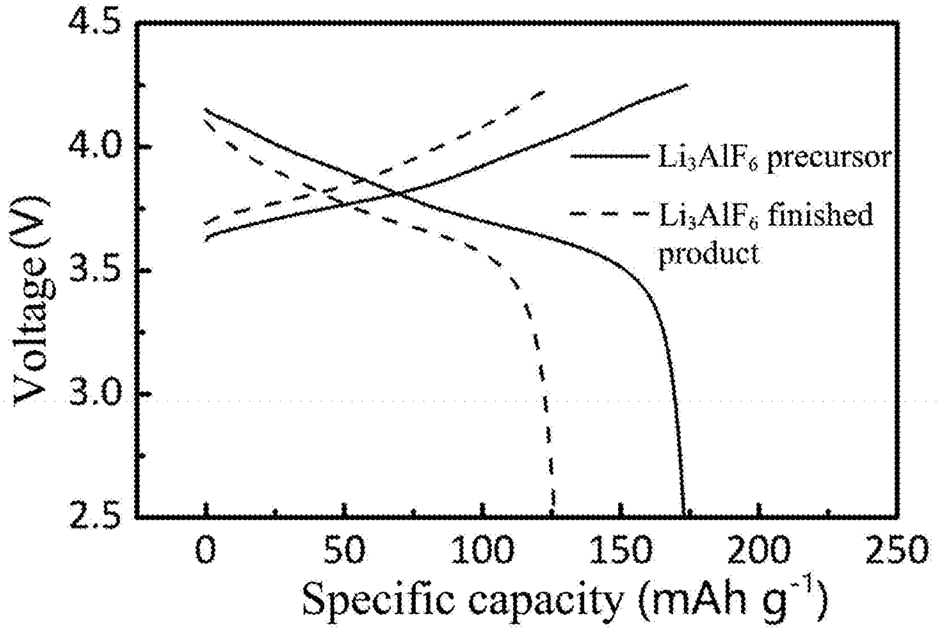
FIG. 11 is a charge-discharge curve of the ternary positive electrode materials coated with $Li_3AlF_6$ using different processes in Example 13 of the present application.

FIG. 11 shows the charge-discharge curve of two 1.0 wt % $Li_3AlF_6$-coated ternary positive electrode materials in Example 13 of the present application in a sulfide all-solid-state battery. It can be seen from FIG. 11 that the ternary positive electrode material coated with 1.0 wt % $Li_3AlF_6$ precursor exhibits better performance.

The description of the above embodiments is only used to help understand the method and core concept of the present application. It should be pointed out that for persons of ordinary skill in the art, several improvements and modifications can be made to the present application without departing from the principles of the present application. These improvements and modifications also fall within the protection scope of the claims of the present application.

The above description of the disclosed embodiments enables those persons of ordinary skill in the art to implement or use the present application. Various modifications to these embodiments will be readily apparent to those persons of ordinary skill in the art, and the general principles defined herein may be implemented in other embodiments without departing from the spirit or scope of the application. Thus, the present application will not be limited to the embodiments shown herein but is to conform to the widest scope consistent with the principles and novel features disclosed herein.

What is claimed is:

1. A ternary composite material for an all-solid-state battery, comprising a ternary material and a fast ion conductor in situ coated on a surface of the ternary material, the fast ion conductor being represented by formula (I);

$$Li_xM_yF_{x+3y} \qquad (I);$$

M is a trivalent metal ion selected from Co, Fe, Al or Ce; $1 \leq x \leq 3$, $1 \leq y \leq 3$; and wherein the fast ion conductor is selected from $Li_3AlF_6$, $LiCoF_4$, $Li_3FeF_6$, $Li_3CoF_6$, $Li_3Ce_2F_9$, $LiFeF_4$, $Li_3CeF_6$, $LiAlF_4$ or $Li_3Ce_2F_9$; and wherein an average particle size of the $Li_xM_yF_{x+3y}$ is 5 nm or more, and the ternary composite material has a D50 of 3-5 μm, a specific surface area of 0.1-1 m$^2$/g, and a coating ratio greater than 85%.

2. The ternary composite material according to claim 1, wherein the ternary material is $LiNi_aCO_bR_{1-a-b}O_2$, and wherein R is Al or Mn, $0.6<a<0.96$, and $0<b \leq 0.1$.

3. A preparation method for the ternary composite material according to claim 1, comprising the following steps:

A) mixing a lithium source, a fluorine source and a trivalent metal compound in a stoichiometric ratio to obtain a $Li_xM_yF_{x+3y}$ precursor;

B) adding the $Li_xM_yF_{x+3y}$ precursor into the ternary material and mixing to obtain a composite material;

C) sintering the composite material at high temperature in a pure oxygen atmosphere to obtain a $Li_xM_yF_{x+3y}$-coated ternary composite material.

4. The preparation method according to claim 3, wherein the lithium source is at least one material selected from a group consisting of lithium nitrate, lithium hydroxide, lithium carbonate and lithium fluoride; the fluorine source is at least one material selected from a group consisting of ammonium fluoride, ammonium bifluoride, hydrogen fluoride, aluminum fluoride and lithium fluoride; and the trivalent metal compound is at least one material selected from a group consisting of cobalt nitrate, ferric nitrate, cerium nitrate, aluminum nitrate, cobalt oxide, iron oxide, cerium oxide, aluminum oxide, cobalt fluoride, iron fluoride, cerium fluoride, aluminum fluoride, cobalt hydroxide, ferric hydroxide, cerium hydroxide and aluminum hydroxide.

5. The preparation method according to claim 3, wherein an addition amount of the $Li_xM_yF_{x+3y}$ precursor is 0.1-15 wt % of the ternary material.

6. The preparation method according to claim 3, wherein in step A), the mixing is performed using at least one method selected from a group consisting of mechanical stirring, magnetic stirring and mechanical ball milling; in step A), a mixing time is 10 to 30 hours; in step B), the mixing is performed using at least one method selected from a group consisting of mechanical stirring, magnetic stirring and mechanical ball milling; in step B), a mixing time is 10 to 30 hours.

7. The preparation method according to claim 3, wherein in step C), a sintering temperature is 250-650° C. and a sintering time is 5-20 hours.

8. A solid-state lithium-ion battery, comprising a positive electrode and a negative electrode, wherein a material of the positive electrode is the ternary composite material according to claim 1.

9. The solid-state lithium-ion battery according to claim 8, wherein the ternary material is $LiNi_aCO_bR_{1-a-b}O_2$, and wherein R is Al or Mn, $0.6<a<0.96$, and $0<b\leq 0.1$.

10. A solid-state lithium-ion battery, comprising a positive electrode and a negative electrode, wherein a material of the positive electrode is the $Li_xM_yF_{x+3y}$-coated ternary composite material prepared by the preparation method according to claim 3.

* * * * *